(12) United States Patent
Terada et al.

(10) Patent No.: US 9,718,158 B2
(45) Date of Patent: Aug. 1, 2017

(54) FASTENING DEVICE AND FASTENING METHOD

(71) Applicant: TOYOTA JIDOSHA KABUSHIKI KAISHA, Toyota-shi, Aichi-ken (JP)

(72) Inventors: Katsuhiko Terada, Toyota (JP); Izumi Matsuzaki, Anjyo (JP); Jinichiro Hirose, Toyota (JP); Takafumi Kunimi, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 698 days.

(21) Appl. No.: 13/733,180

(22) Filed: Jan. 3, 2013

(65) Prior Publication Data

US 2013/0175065 A1 Jul. 11, 2013

(30) Foreign Application Priority Data

Jan. 5, 2012 (JP) ................................. 2012-000578

(51) Int. Cl.
| | |
|---|---|
| *B23P 19/06* | (2006.01) |
| *B23Q 5/04* | (2006.01) |
| *B23Q 35/42* | (2006.01) |
| *B25B 23/02* | (2006.01) |
| *B23Q 35/02* | (2006.01) |
| *G01B 3/14* | (2006.01) |

(52) U.S. Cl.
CPC ............... *B23P 19/06* (2013.01); *B23Q 5/04* (2013.01); *B23Q 35/42* (2013.01); *B23Q 35/02* (2013.01); *B25B 23/02* (2013.01); *G01B 3/14* (2013.01)

(58) Field of Classification Search
CPC ........... B23P 19/06; B23P 21/00; B23P 19/12; B23Q 5/04; B23Q 16/00; B23Q 9/0078; B23Q 35/42; B23Q 35/44; Y10T 83/883; B23B 47/287; B23B 47/28; G01B 3/14; B25B 23/02; B25B 23/08
USPC ....... 173/1, 13, 2; 29/712, 701; 33/562, 563, 33/520, 566
See application file for complete search history.

(56) References Cited

U.S. PATENT DOCUMENTS 4,543,970 A * 10/1985 Noh et al. ................... 134/62
4,759,121 A * 7/1988 Lang .......................... 29/701
(Continued)

FOREIGN PATENT DOCUMENTS

| JP | 6-91450 | 4/1994 |
| JP | 7-315266 | 12/1995 |

(Continued)

*Primary Examiner* — Hemant M Desai
*Assistant Examiner* — Eduardo R Ferrero
(74) *Attorney, Agent, or Firm* — Finnegan, Henderson, Farabow, Garrett & Dunner, LLP (57) ABSTRACT

A fastening device includes first to third rotary sensors (position detecting unit) which are provided in a support arm and detect a position of a nut runner (fastening tool), and a main controller (controlling unit) which has a storage unit for storing a plurality of fastening positions of a chain cover, and drives the nut runner when a detection result from the first to third rotary sensors coincides with position information of the fastening position of the chain cover stored by the storage unit. Therefore, during a fastening work, an operator does not need to pull a trigger to drive and rotate the nut runner, thus reducing a burden on the operator during the fastening work.

5 Claims, 7 Drawing Sheets

(56) References Cited

U.S. PATENT DOCUMENTS

| | | | | |
|---|---|---|---|---|
| 4,891,889 | A * | 1/1990 | Tomelleri | 33/503 |
| 4,937,759 | A * | 6/1990 | Vold | 700/262 |
| 5,140,743 | A * | 8/1992 | Kautt | 29/701 |
| 5,199,147 | A * | 4/1993 | Whiteside | 29/281.1 |
| 5,722,148 | A * | 3/1998 | Uemoto et al. | 29/468 |
| 5,910,894 | A * | 6/1999 | Pryor | 700/95 |
| 6,220,796 | B1 * | 4/2001 | Chiang | 408/115 R |
| 6,435,297 | B1 * | 8/2002 | Barber et al. | 180/291 |
| 6,643,945 | B1 * | 11/2003 | Starks | 33/566 |
| 6,763,573 | B2 * | 7/2004 | Walt et al. | 29/707 |
| 7,143,494 | B2 * | 12/2006 | Savoy | 29/407.1 |
| 7,246,030 | B2 * | 7/2007 | Raab et al. | 702/152 |
| 7,546,689 | B2 * | 6/2009 | Ferrari et al. | 33/503 |
| 7,874,056 | B2 * | 1/2011 | Campbell | 29/407.01 |
| 8,051,577 | B1 * | 11/2011 | Gheesling et al. | 33/563 |
| 8,434,214 | B2 * | 5/2013 | Marx | 29/700 |
| 2004/0050451 | A1 * | 3/2004 | Dahlhoff | 144/144.1 |
| 2004/0126197 | A1 * | 7/2004 | Allemann et al. | 409/182 |
| 2005/0046239 | A1 * | 3/2005 | Nakamura et al. | 296/204 |
| 2007/0169331 | A1 * | 7/2007 | Yoshida et al. | 29/464 |
| 2007/0180674 | A1 * | 8/2007 | Morden et al. | 29/407.01 |
| 2007/0214921 | A1 * | 9/2007 | Fechter | B25B 21/005 81/467 |
| 2008/0092373 | A1 * | 4/2008 | Lim | 29/700 |
| 2008/0178713 | A1 * | 7/2008 | Long | B23P 19/066 81/467 |
| 2010/0012260 | A1 * | 1/2010 | Brennan et al. | 156/196 |
| 2010/0072687 | A1 * | 3/2010 | Shinkai et al. | 269/40 |
| 2010/0187738 | A1 * | 7/2010 | Tozaki | 269/71 |
| 2011/0126792 | A1 * | 6/2011 | Wiebe | 123/195 R |
| 2011/0214890 | A1 * | 9/2011 | Wallgren | 173/2 |
| 2012/0000682 | A1 * | 1/2012 | Grazioli | 173/1 |
| 2012/0073410 | A1 * | 3/2012 | Hoffman et al. | 81/434 |
| 2013/0032369 | A1 * | 2/2013 | Dridger | 173/2 |
| 2014/0190314 | A1 * | 7/2014 | Ono et al. | 81/57.4 |
| 2014/0216772 | A1 * | 8/2014 | Lee | 173/1 |
| 2014/0223712 | A1 * | 8/2014 | Ikeda et al. | 29/243.521 |

FOREIGN PATENT DOCUMENTS

| | | |
|---|---|---|
| JP | 2008-93818 | 4/2008 |
| JP | 2008-200812 | 9/2008 |
| JP | 2011-131330 | 7/2011 |

* cited by examiner

FASTENING DEVICE AND FASTENING METHOD

INCORPORATION BY REFERENCE

The disclosure of Japanese Patent Application No. 2012-000578 filed on Jan. 5, 2012 including the specification, drawings and abstract is incorporated herein by reference in its entirety.

BACKGROUND OF THE INVENTION

1. Field of the Invention

The present invention relates to a fastening device which fastens a fastening bolt when, for example, an engine part of an automobile is assembled, and to a fastening method for fastening a fastening bolt by using the fastening device.

2. Description of Related Art

Conventionally, various fastening devices have been proposed. For example, in a fixture device for screw fastening work according to Japanese Patent Application Publication No. 2008-93818 (JP 2008-93818 A), when a vehicle body is conveyed through an overhead hanger to an assembly line, an operator ascends or descends a nut runner to a work position on a bottom surface side of the vehicle body and fastens nuts to various types of arms of a suspension system by controlling the nut runner.

However, in the fixture device for screw fastening work according to JP 2008-93818 A, an operator moves the nut runner to each fastening position of a work, and then drives and rotates the nut runner by pulling a trigger. Therefore, a fastening work such as the trigger operation places a burden on the operator. Particularly, in the case of a work having a number of fastening positions located in very different height, an operator is required to repeatedly control a trigger in awkward postures. This is a significant physical burden for the operator.

SUMMARY OF THE INVENTION

The present invention has been accomplished in view of the foregoing problem, and an object of the present invention is to provide a fastening device and a fastening method which are able to ease a burden on an operator during a fastening work of a fastening bolt.

In order to solve the above-mentioned problem, a fastening device according to an aspect of the present invention includes a storage unit for storing fastening positions of a work, a position detecting unit for detecting a position of a fastening tool, and a controlling unit for driving the fastening tool when a detection result from the position detecting unit coincides with the fastening position of the work stored by the storage unit.

Further, a fastening method according to another aspect of the present invention includes the steps of feeding a fastener to a fastening tool, moving the fastening tool to a fastening position of a work with assistance from a support arm, and fastening the fastener by automatically driving the fastening tool when the fastening tool reaches the fastening position of the work.

Accordingly, a burden on an operator is reduced during a fastening work of a fastening bolt when assembling an engine part of an automobile.

Various aspects of the fastening device and the fastening method according to the present invention, as well as the effects thereof will be explained in detail in Aspects of Invention below.

There will be described various aspects of the invention (hereinafter referred to as "claimable invention" where appropriate) deemed to contain claimable features for which protection is sought. Each of these aspects of the invention is numbered like the appended claims and depends from the other aspect or aspects, where appropriate, for easier understanding of the technical features disclosed in the present specification. It is to be understood that the claimable invention is not limited to the technical features or any combinations thereof which will be described in each of these aspects. That is, the scope of the claimable invention should be interpreted in the light of the following descriptions accompanying the various aspects and preferred embodiments of the invention. In a limit in accordance with such an interpretation, an aspect of the claimable invention can be constituted by not only any one of these aspects but also either an aspect provided by any one of these aspects and additional component or components incorporated therein and an aspect provided by any one of these aspects without some of components recited therein.

According to a first aspect of the present invention, a fastening device includes: a fastening tool; a support arm which holds the fastening tool and supports movement of the fastening tool to a fastening position of a work; a storage unit for storing the fastening position of the work; a position detecting unit for detecting a position of the fastening tool; and a controlling unit for driving the fastening tool when a detection result from the position detecting unit coincides with the fastening position of the work stored by the storage unit.

In the fastening device according to the first aspect, after feeding a fastener to the fastening tool, an operator moves the fastening tool to a given fastening position of the work with assistance from the support arm. Then, when a detecting result from the position detecting unit coincides with the fastening position of the work stored by the storage unit, the fastening tool is automatically driven to rotate and fastens the work with the fastener.

According to a second aspect of the present invention, in the fastening device according to the first aspect, there are a plurality of the fastening positions in the work, and the storage unit stores a fastening order of the respective fastening positions of the work.

With the fastening device according to the second aspect, even if an operator follows a wrong fastening order, the fastening tool is not driven to rotate at the fastening position in the wrong order.

According to a third aspect of the present invention, the fastening device according to the first or second aspect further includes a guiding jig which guides the fastening tool to the fastening position of the work.

With the fastening device according to the third aspect, the guiding jig further simplifies a fastening work conducted by an operator.

According to a fourth aspect of the present invention, in the fastening device according to the third aspect, the guiding jig includes a guiding plate which extends like a ring on an outer side of each of the fastening positions of the work, and which has guiding recesses that are provided on an inner peripheral face of the guiding plate at positions corresponding to the respective fastening positions of the work and that lie parallel to an outer peripheral face of the fastening tool.

With the fastening device according to the fourth aspect, especially, the guiding recesses are formed on the inner peripheral face of the guiding plate so as to lie along the outer peripheral face of the fastening tool. Therefore, when an operator moves the fastening tool to a given fastening position of the work, the operator only needs to position the outer peripheral face of the fastening tool in parallel to an inner peripheral face of the guiding recess of the guiding plate, and then simply move the fastening tool forward along the guiding recess. Hence, the fastening work is significantly simplified. Moreover, after completion of the fastening work, the operator is able to retract the fastening tool from the guiding recess only by moving the fastening tool to the inner side of the guiding plate and move the fastening tool to the next fastening position. Thus, a moving range of the fastening tool is minimized.

According to a fifth aspect of the present invention, in the fastening device according to any one of the first to fourth aspects, the position detecting unit is constructed from a plurality of rotary sensors provided in the support arm.

With the fastening device according to the fifth aspect, a position of the fastening tool is identified based on detecting results from the plurality of rotary sensors.

According to a sixth aspect of the present invention, in the fastening device according to any one of the first to fifth aspects, the support arm includes a first arm connected to a support body so that the first arm is able to turn about a fulcrum, a second arm which is connected to the first arm so that the second arm is able to turn about a fulcrum, and holds the fastening tool in a distal end thereof, and an assisting unit which extends in parallel with the second arm, is connected to the first arm so that the assisting unit is able to turn about a fulcrum, and assists movement of the fastening tool.

According to a seventh aspect of the present invention, in the fastening device according to the sixth aspect, the first arm, the second arm, and the assisting unit are able to turn about fulcrums, respectively, on a plane which is approximately parallel with a fastening face of the work, and the second arm and the assisting unit are able to turn about the fulcrums thereof so that the second arm and the assisting unit move forward and backward with respect to the fastening face.

In the fastening device according to the sixth and seventh aspects, the first and second arms allow the fastening tool to move to the fastening position as intended by an operator. Moreover, the assisting unit assists movement of the fastening tool when an operator moves the fastening tool.

According to an eighth aspect of the present invention, in the fastening device according to any one of the first to seventh aspects, the fastening tool is a nut runner, and a socket attached to the nut runner has a socket cover that is attached to the socket and protects an outer periphery of the socket.

In the fastening device according to the eighth aspect, since the socket is protected by the socket cover, it is possible to prevent the socket from coming into direct contact with the guiding recess of the guiding plate when the socket is driven to rotate. This inhibits wear and so on of the socket.

According to a ninth aspect of the present invention, in the fastening device according to any one of the first to eighth aspects, the work is a chain cover that is an engine part of an automobile.

The fastening device according to the ninth aspect is effective especially when, by use of fasteners, fastening the chain cover, an engine part of an automobile, that has a number of fastening points and in which upper fastening points and lower fastening points are located at very different height.

According to a tenth aspect of the present invention, in the fastening device according to any one of the fourth to ninth aspects, numbers that represent a fastening order are displayed in vicinities of the respective guiding recesses on a surface of the guiding plate of the guiding jig.

According to an eleventh aspect of the present invention, in the fastening device according to any one of the fourth to ninth aspects, display lamps are provided in vicinities of the respective guiding recesses on a surface of the guiding plate of the guiding jig so that a fastening order is recognized.

With the fastening device according to the tenth and eleventh aspects, it is possible that an operator accurately recognizes the fastening order for the work.

According to a twelfth aspect of the present invention, a fastening method for fastening a fastener using a fastening device, which has a fastening tool, and a support arm which holds the fastening tool and supports movement of the fastening tool to a fastening position of a work, includes the steps of: feeding a fastener to the fastening tool; moving the fastening tool to the fastening position of the work with assistance from the support arm; and fastening the fastener by automatically driving the fastening tool when the fastening tool reaches the fastening position of the work.

With the fastening method according to the twelfth aspect, since an operator is not required to pull a trigger in order to drive the fastening tool, a fastening work is significantly simplified compared to a conventional fastening method. Moreover, even when the fastening points are located in very different height, a physical burden on an operator is greatly reduced compared to the conventional fastening method.

According to a thirteenth aspect of the present invention, the fastening method according to the twelfth aspect further includes the step of attaching a guiding jig to the work, prior to the step of feeding the fastener, the guiding jig including a guiding plate which extends like a ring on an outer side of each of a plurality of the fastening positions of the work, and guiding recesses which are provided on an inner peripheral face of the guiding plate at positions corresponding to the respective fastening positions of the work and lie parallel to an outer peripheral face of the fastening tool.

With the fastening method according to the thirteenth aspect, by attaching the guiding jig to the work in advance, an operator only needs to do the fastening work along the guiding jig. Therefore, the fastening work is considerably simplified.

According to a fourteenth aspect of the present invention, in the fastening method according to the thirteenth aspect, in the step of moving the fastening tool, the fastening tool is moved forward to a fastening face of the work along the guiding recess of the guiding jig attached to the work so that the fastening tool reaches the fastening position of the work.

With the fastening method according to the fourteenth aspect, when an operator moves the fastening tool to a given fastening position of the work, the operator just needs to position the outer periphery of the fastening tool parallel to the inner peripheral face of the guiding recess of the guiding plate and then simply move the fastening tool forward along the guiding recess. Therefore, the fastening work is simplified further.

According to a fifteenth aspect of the present invention, the fastening method according to the thirteenth or fourteenth aspect further includes the step of retracting the fastening tool from the fastening position and moving the fastening tool to an inner side of the guiding plate from the guiding recess, after the step of fastening the fastener.

With the fastening method according to the fifteenth aspect, after fastening is completed, an operator is able to retract the fastening tool from the guiding recess only by moving the fastening tool to the inner side of the guiding plate, and move the fastening tool to the next fastening position. Hence, a moving range of the fastening tool is minimized.

According to any of the above aspects of the present invention, it is possible to provide a fastening device and a fastening method which reduce a burden on an operator during a work for fastening a fastening bolt.

DETAILED DESCRIPTION OF THE EMBODIMENTS

Modes for carrying out the present invention will be described below in detail based on FIG. 1 to FIG. 7.

Figure 1:
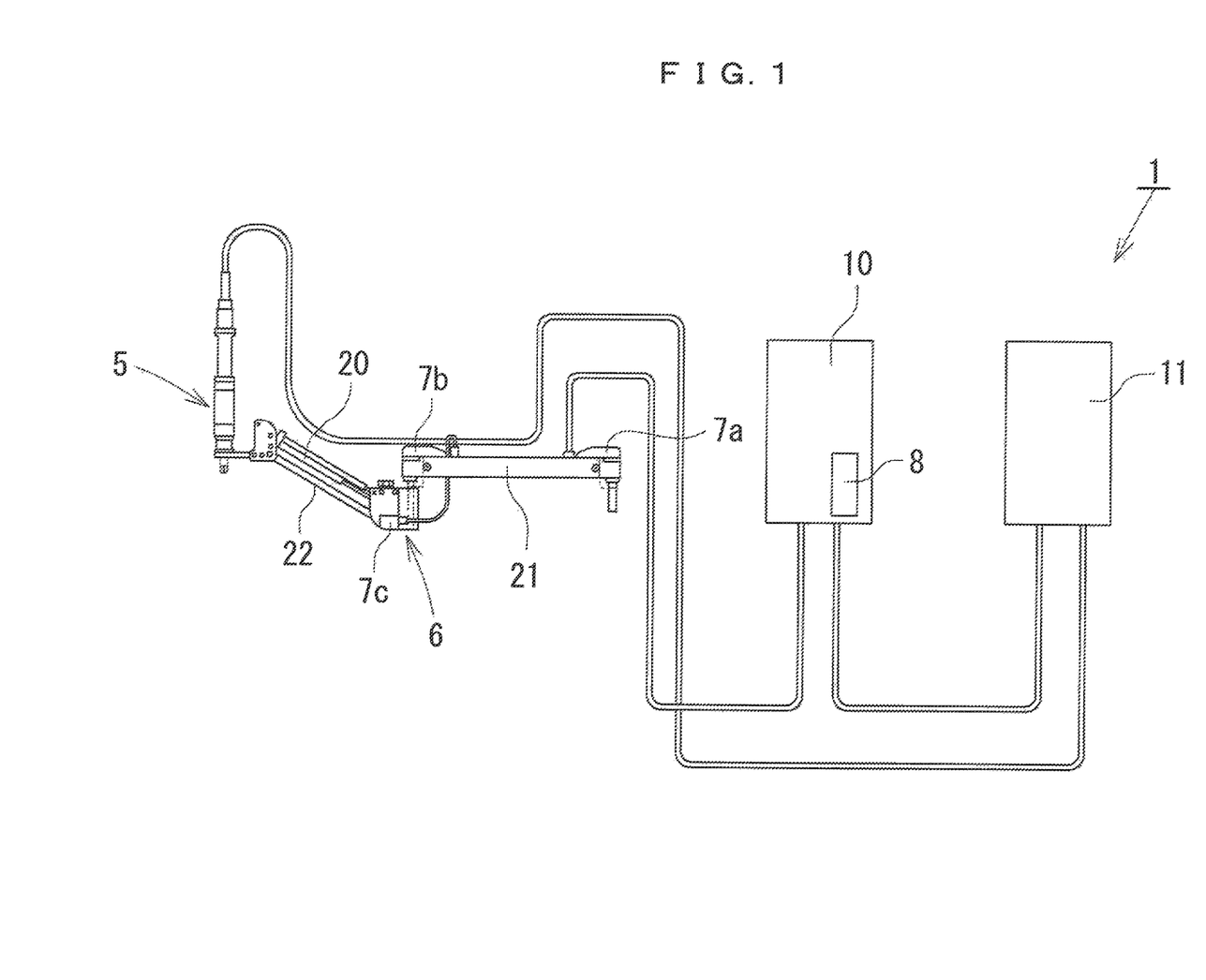
FIG. 1 is a schematic view of a fastening device according to an embodiment of the present invention.
Figure 2:
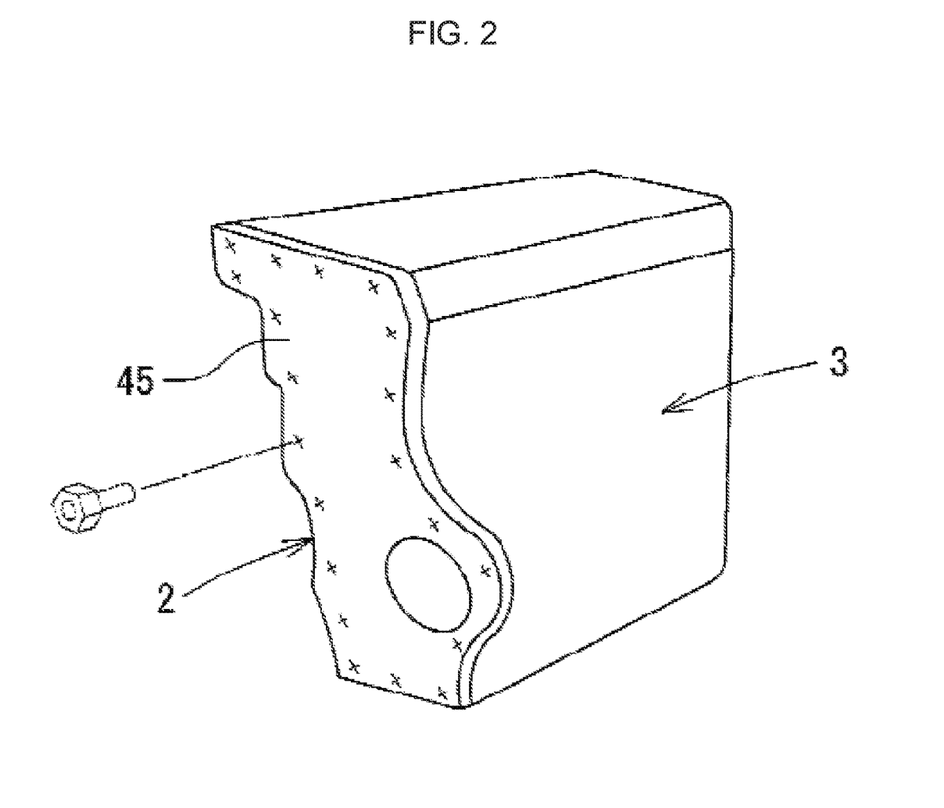
FIG. 2 is a view showing a state where a chain cover is attached to an internal combustion engine of an automobile.
Figure 3A:
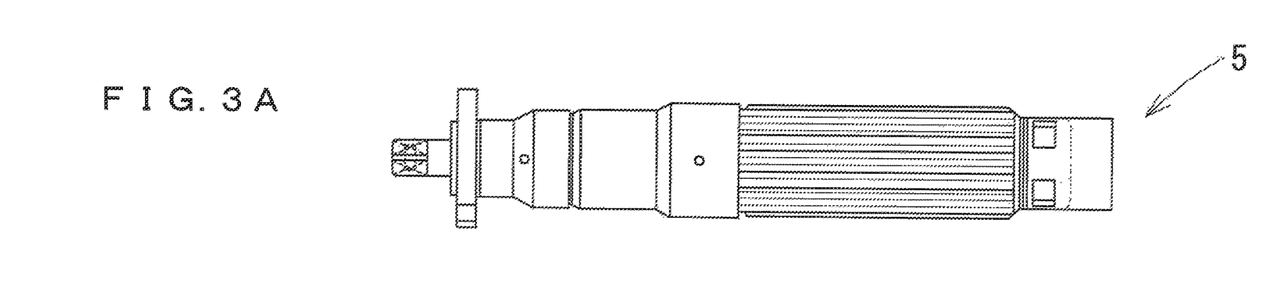
FIG. 3A is a plan view of a nut runner adopted for the fastening device according to the embodiment of the present invention.
Figure 3B:
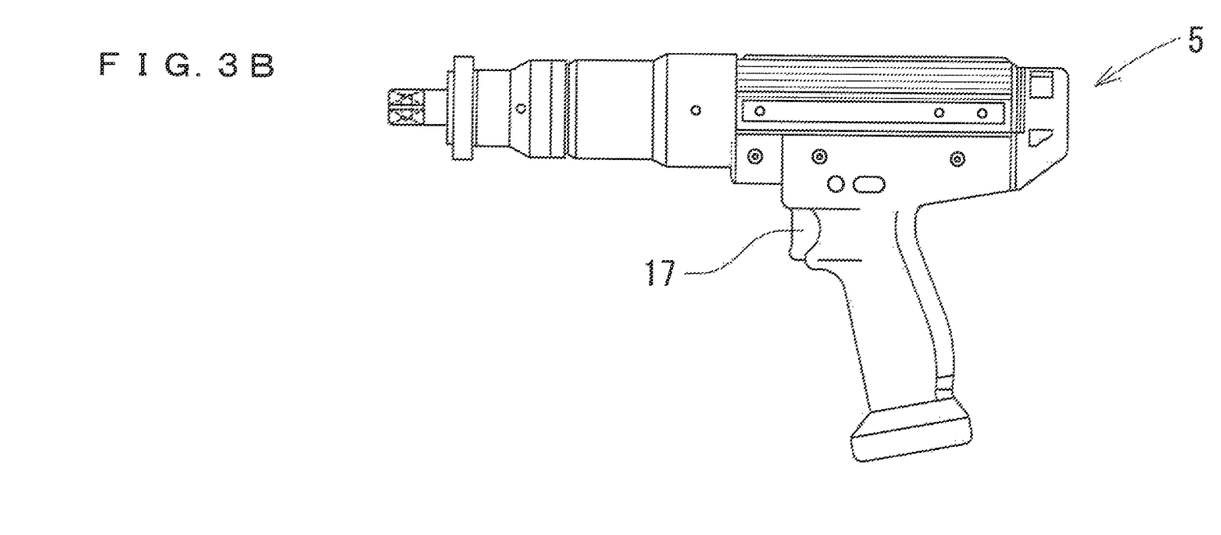
FIG. 3B is a side view of the nut runner.

As illustrated in FIG. 1 and FIG. 2, a fastening device 1 according to an embodiment of the present invention is used for fastening a plurality of fastening bolts (fasteners) when a chain cover 2 which is a work of an engine part is assembled to an internal combustion engine 3. There are at least 25 fastening positions (marked by x in FIG. 2) in the chain cover 2, and a difference in height between the fastening positions on the upper side and the lower side is at least 50 cm.

As illustrated in FIG. 1, the fastening device 1 according to the embodiment of the present invention includes a nut runner 5 serving as a fastening tool, a support arm 6 which holds the nut runner 5 and supports movement of the nut runner 5 when an operator moves the nut runner 5 to a fastening position of the chain cover 2, first to third rotary sensors 7a to 7c serving as a position detecting unit, which are provided in the support arm 6 and detect a position of the nut runner 5, and a storage unit 8 for storing position information of the plurality of fastening positions of the chain cover 2. The fastening device 1 is also provided with a main controller 10 serving as a controlling unit for driving the nut runner 5 when a detection result from the first to third rotary sensors 7a to 7c coincides with the position information of each of the fastening positions of the chain cover 2 stored by the storage unit 8, a NR driving controller 11 which drives the nut runner 5 based on a drive signal transmitted from the main controller 10, and a guiding jig 12 (see FIG. 6A and FIG. 6B) which guides the nut runner 5 to each of the fastening positions of the chain cover 2.

Figure 4A:
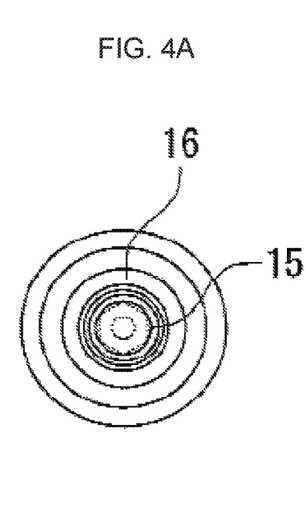
FIG. 4A is a front view of a socket and a socket cover attached to the nut runner.
Figure 4B:
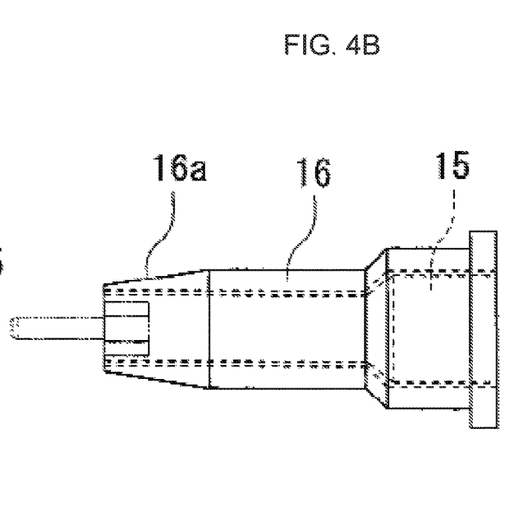
FIG. 4B is a side view of the socket and the socket cover.

As illustrated in FIG. 1, FIG. 3A, FIG. 3B, FIG. 4A, and FIG. 4B, a socket 15 which supports a fastening bolt is fixed to the nut runner 5. A cylindrical socket cover 16 is provided in the periphery of the socket 15 in order to protect the socket 15. As shown in FIG. 4B, it is preferred that a tapered portion 16a is formed in a distal end of the socket cover 16 towards the distal end. This improves operability when the socket 15 of the nut runner 5 is positioned to a guiding recess 36 of a guiding plate 35 of the guiding jig 12 described later. Since the socket cover 16 is provided, the socket 15 which is driven to rotate is prevented from coming into direct contact with the guiding recess 36 of the guiding plate 35 of the later-described guiding jig 12, thus inhibiting wear and so on of the socket 15. Further, the nut runner 5 is electrically connected to the NR driving controller 11 and driven based on a drive signal from the NR driving controller 11. Although not used in a normal fastening work, a trigger 17 is provided in the nut runner 5.

The NR driving controller 11 drives and rotates the nut runner 5 based on a drive signal from the main controller 10. Also, tightening torque at each of the fastening positions of the chain cover 2 is stored in advance in the NR driving controller 11. When a given tightening torque is not applied when a fastener is fastened using the nut runner 5, the NR driving controller 11 provides a warning by, for example, displaying the warning, and controls the nut runner 5 so that rotation of the nut runner 5 is automatically stopped. Moreover, when a rotation direction changeover switch of the nut runner 5 is switched from a forward rotation direction to a reverse rotation direction while the nut runner 5 is driven to rotate automatically, the NR driving controller 11 controls the nut runner 5 so that rotation of the nut runner 5 is (manually) stopped. Yet further, when the rotation direction changeover switch of the nut runner 5 is switched from the forward rotation direction to the reverse rotation direction, the NR driving controller 11 controls the nut runner 5 so that a function of trigger operation is activated.

Figure 5A:
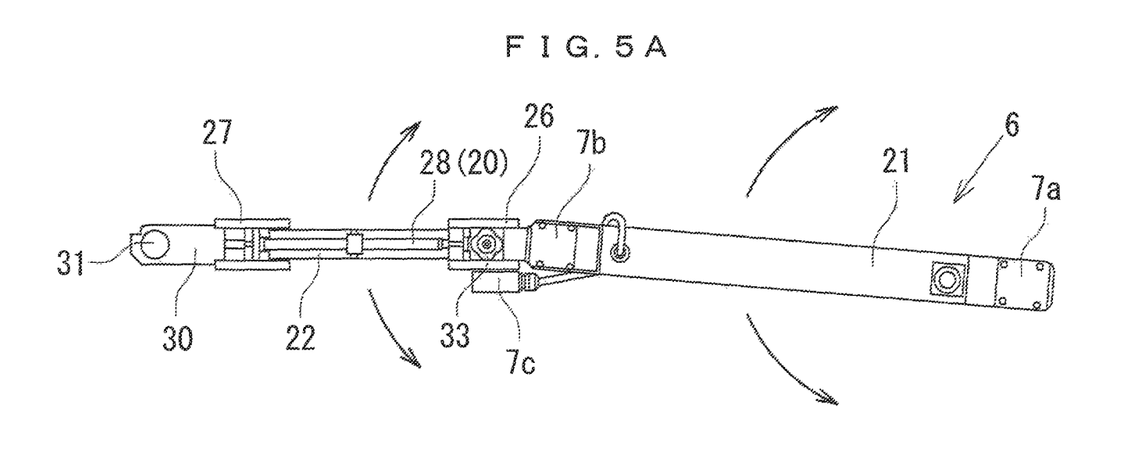
FIG. 5A is a plan view of a support arm adopted for the fastening device according to the embodiment of the present invention.
Figure 5B:
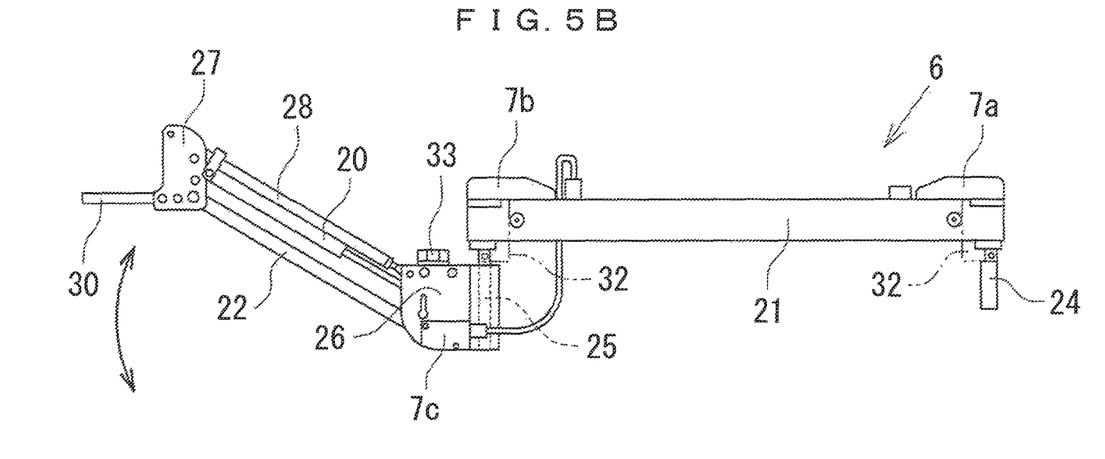
FIG. 5B is a side view of the support arm.

As illustrated in FIG. 5A and FIG. 5B, the support arm 6 plays a role as a support for movement of the nut runner 5 when the nut runner 5 is moved by an operator to each of the fastening positions of the chain cover 2. The support arm 6 includes a first arm 21 connected a support body (not illustrated) so that the first arm 21 is able to turn, a second arm 22 which is connected to the first arm 21 so that the second arm 22 is able to turn about a fulcrum and holds the nut runner 5 in a distal end thereof, and a gas spring 20 which extends in parallel with the second arm 22, is connected to the first arm 21 so that the gas spring 20 is able to turn about a fulcrum, and serves as an assisting unit for assisting movement of the nut runner 5.

The support arm 6 will be described in detail.

In one end portion of the first arm 21, a support rod 24 is fixed. The support rod 24 extends in a direction orthogonal to a direction in which the first arm 21 extends. The support rod 24 is connected to the support body so that the support rod 24 is able to turn. As a result, the first arm 21 is able to rotate about the support rod 24 on a plane parallel with a fastening face 45 (see FIG. 2) of the chain cover 2. The first rotary sensor 7a is arranged in the one end portion of the first arm 21 on a surface on the opposite side of the support rod 24 side. The first rotary sensor 7a detects a rotation angle of the first arm 21 around the support rod 24 which serves as a fulcrum with respect to the support body, in other words, a rotation angle of the support rod 24 with respect to the support body. A turning regulating stopper 32 is provided in the one end portion of the first arm 21 and regulates a turning range of the first arm 21 (the support rod 24).

In the other end portion of the first arm 21, a connecting rod 25 which extends in the same direction as the support rod 24 is supported so that the connecting rod 25 is able to turn. The connecting rod 25 is fixed to a first connector 26. The second arm 22 and the gas spring 20 extend in parallel with each other between the first connector 26 and a second connector 27. The second arm 22 and the gas spring 20 are supported by the first connector 26 and the second connector 27 so that the second arm 22 and the gas spring 20 are able to turn. As a result, like the first arm 21, the second arm 22 and the gas spring 20 are able to turn, on a plane parallel with the fastening face 45 (see FIG. 2) of the chain cover 2, about the connecting rod 25 which serves as a fulcrum. In addition, the second connector 27 is able to turn about the first connector 26 which serves as a fulcrum so that the second connector 27 moves forward and backward with respect to the fastening face 45 (see FIG. 2) of the chain cover 2. A support rod 28 is fixed to the gas spring 20.

In the other end portion of the first arm 21, the second rotary sensor 7b is arranged on a surface on the opposite side of the connecting rod 25 side. The second rotary sensor 7b detects a rotation angle of the second arm 22 about the connecting rod 25 which serves as a fulcrum with respect to the first arm 21, in other words, a rotation angle of the connecting rod 25 (the first connector 26) with respect to the first arm 21. A plate-shaped tool attachment 30 extends from the second connector 27 in the same direction as the direction in which the first arm 21 extends. The tool attachment 30 has a through hole 31 which supports the nut runner 5. The through hole 31 is made to face the fastening face 45 of the chain cover 2. The third rotary sensor 7c is arranged in one end face of the first connector 26. The third rotary sensor 7c detects a rotation angle of the second arm 22 with respect to the first connector 26. The first to third rotary sensors 7a to 7c are electrically connected to the main controller 10. The other end portion of the first arm 21 is provided with a turning regulating stopper 32 which regulates a turning range of the second arm 22 and the gas spring 20 (the first connector 26 and the connecting rod 25) in the same direction as the first arm 21. A reference numeral 33 is a supporting force adjusting knob for adjusting a supporting force of the gas spring 20. The supporting force of the gas spring 20 is increased when the supporting force adjusting knob 33 is turned in an anticlockwise direction.

As illustrated in FIG. 1, the main controller 10 is electrically connected to the first to third rotary sensors 7a to 7c, and is also electrically connected to the NR driving controller 11. The main controller 10 has the storage unit 8 which previously stores position information of each of the fastening positions of the chain cover 2 and a fastening order of the fastening positions. When an operator moves the nut runner 5 to an nth fastening position of the chain cover 2, the main controller 10 controls the NR driving controller 11 so that the NR driving controller 11 transmits a drive signal once signals detected by the first to third rotary sensors 7a to 7c coincide with position information of the nth fastening position.

Figure 6A:
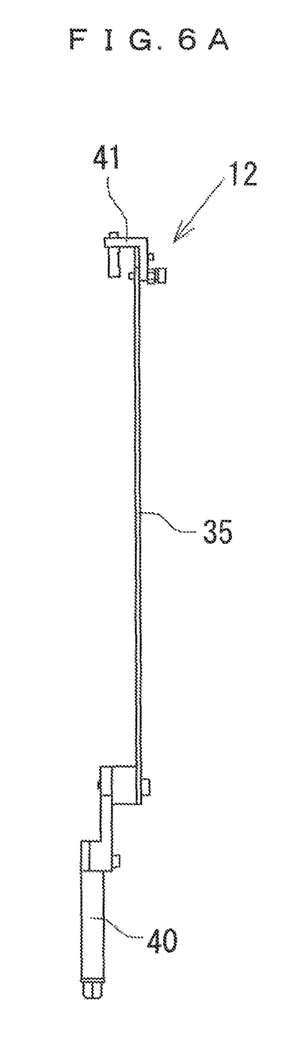
FIG. 6A is a front view of a guiding jig adopted for the fastening device according to the embodiment of the present invention.
Figure 6B:
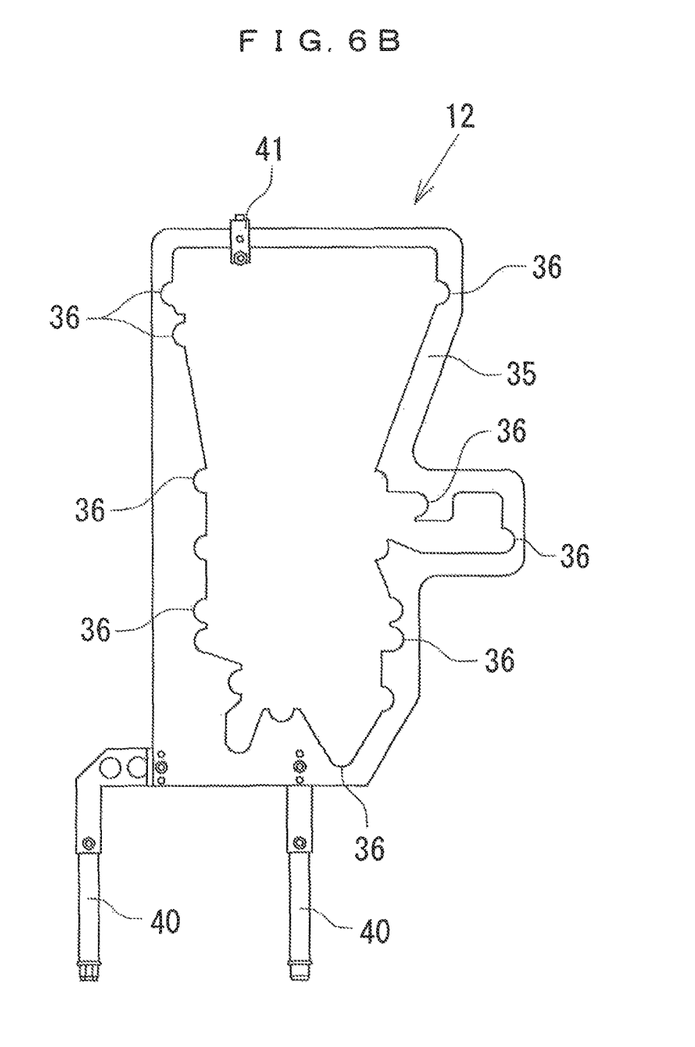
FIG. 6B is a side view of the guiding jig.

As shown in FIG. 6A and FIG. 6B, the guiding jig 12 is mounted so as to cover the fastening face 45 of the chain cover 2 which is preliminary assembled to the internal combustion engine 3 illustrated in FIG. 2. The guiding jig 12 is formed of the guiding plate 35 which extends like a ring on the outer side of each of the fastening positions (marked by x in FIG. 2) of the chain cover 2, and the guiding recesses 36 which are provided on the inner peripheral face of the guiding plate 35 at positions corresponding to the respective fastening positions of the chain cover 2 and lie parallel to the outer peripheral face of the socket cover 16 (see FIG. 4A and FIG. 4B) mounted on the socket 15 of the nut runner 5.

Each of the guiding recesses 36 is formed into an arc-like shape along the outer peripheral face of the socket cover 16 of the nut runner 5. Although not illustrated, numbers that represent the fastening order are displayed in the vicinities of the respective guiding recesses 36 on a surface of the guiding plate 35. As another embodiment, display lamps may be provided in the vicinities of the respective guiding recesses 36 so that the fastening order can be recognized. Legs 40 are projecting from a lower wall portion of the guiding jig 12 such that the guiding jig 12 is supported by a table (not illustrated) on which the internal combustion engine 3 with the chain cover 2 preliminarily assembled thereto is mounted. A reference numeral 41 is a fixing piece for attaching the guiding jig 12 to the internal combustion engine 3 to which the chain cover 2 is assembled preliminarily. The fixing piece 41 is constructed to bridge an upper wall portion of the guiding plate 35 and is able to slide along the upper wall portion.

When the guiding jig 12 stands using the legs 40 thereof on the table on which the internal combustion engine 3 with the chain cover 2 preliminarily assembled thereto is mounted, and the guiding jig 12 is attached to the chain cover 2 through the fixing piece 41 so as to cover the fastening face 45 of the chain cover 2, a clearance is made between the fastening face 45 of the chain cover 2 and a back surface of the guiding plate 35. Simultaneously, the guiding recesses 36 of the guiding plate 35 and fastening holes which serve as the fastening positions of the chain cover 2 are concentrically located, respectively.

Explained next will be a fastening method for fastening respective fastening bolts when the chain cover 2 is assembled to the internal combustion engine 3 by using the fastening device 1 according to the embodiment of the present invention.

First of all, in a step of attaching the guiding jig 12, the guiding jig 12 is attached through the fixing piece 41 and the respective legs 40 so as to cover the fastening face 45 of the chain cover 12. Then, a clearance is made between the fastening face 45 of the chain cover 2 and the back surface of the guiding plate 35. At the same time, the guiding recesses 36 provided in the guiding plate 35 and the fastening holes which serve as the fastening positions of the chain cover 2 are concentrically located, respectively. Thereafter, a distal end of the nut runner 5 is inserted in the through hole 31 of the tool attachment 30 which extends from the second connector 27 of the support arm 6.

Next, in a step of feeding a fastening bolt, an operator feeds a fastening bolt to the socket 15 attached to the distal end of the nut runner 5.

In the next step of moving the nut runner 5, when an operator fastens the fastening bolt at the nth fastening position of the chain cover 2, the operator moves the nut runner 5 by turning the first and second arms 21 and 22 of the support arm 6 on a plane parallel with the fastening face 45 of the chain cover 2. Then, the operator turns the second arm 22 only so that the nut runner 5 moves forward to the fastening face 45 of the chain cover 2. Thus, the outer peripheral face of the socket cover 16 of the nut runner 5 is positioned parallel to the nth guiding recess 36 in the guiding plate 35. At this time, the operator is able to move the nut runner 5 with a weak force due to an urging force generated by the gas spring 20. Also, once the outer peripheral face of the socket cover 16 of the nut runner 5 is positioned parallel to the nth guiding recess 36 of the guiding plate 35, the position of the nut runner 5 is determined on the plane parallel with the fastening face 45 of the chain cover 2. In other words, at this point of time, the nut runner 5 is located concentrically with the nth fastening position (fastening hole) of the chain cover 2. Thereafter, the nut runner 5 is further moved forward to the fastening face 45 of the chain cover 2 along the nth guiding recess 36.

Next, in a step of fastening a fastening bolt, the nut runner 5 is moved forward so that the socket cover 16 lies parallel to the guiding recess 36. Then, once a distal end face of the socket 15 projects from the back surface of the guiding plate 35, in other words, once detection results from the first to third rotary sensors 7a to 7c coincide with the position information of the nth fastening position of the chain cover 2, which is stored by the storage unit 8 of the main controller 10, the main controller 10 transmits a drive signal to the NR driving controller 11. The NR driving controller 11 then transmits a driving signal to the nut runner 5 and the nut runner 5 is driven to rotate and fastens the fastening bolt.

Next, after the step of fastening the fastening bolt is conducted by the nut runner 5 normally, in the following step of retracting the nut runner 5, rotation of the nut runner 5 is automatically stopped, and the operator retracts the nut runner 5 along the guiding recess 36 of the guiding plate 35. The operator then moves the nut runner 5 towards the inner side of the guiding plate 35 from the guiding recess 36, and moves the nut runner 5 to the next fastening position.

By repeating the above-mentioned steps of feeding a fastening bolt, fastening a fastening bolt, and retracting the nut runner 5 at each of the fastening positions of the chain cover 2, the chain cover 2 is assembled to the internal combustion engine 3 by each of the fastening bolts. Even if an operator attempts to fasten the fastening bolts in a wrong order of the fastening positions of the chain cover 2, the nut runner 5 is not driven at any fastening position in the wrong order, thus inhibiting a human error.

Figure 7:
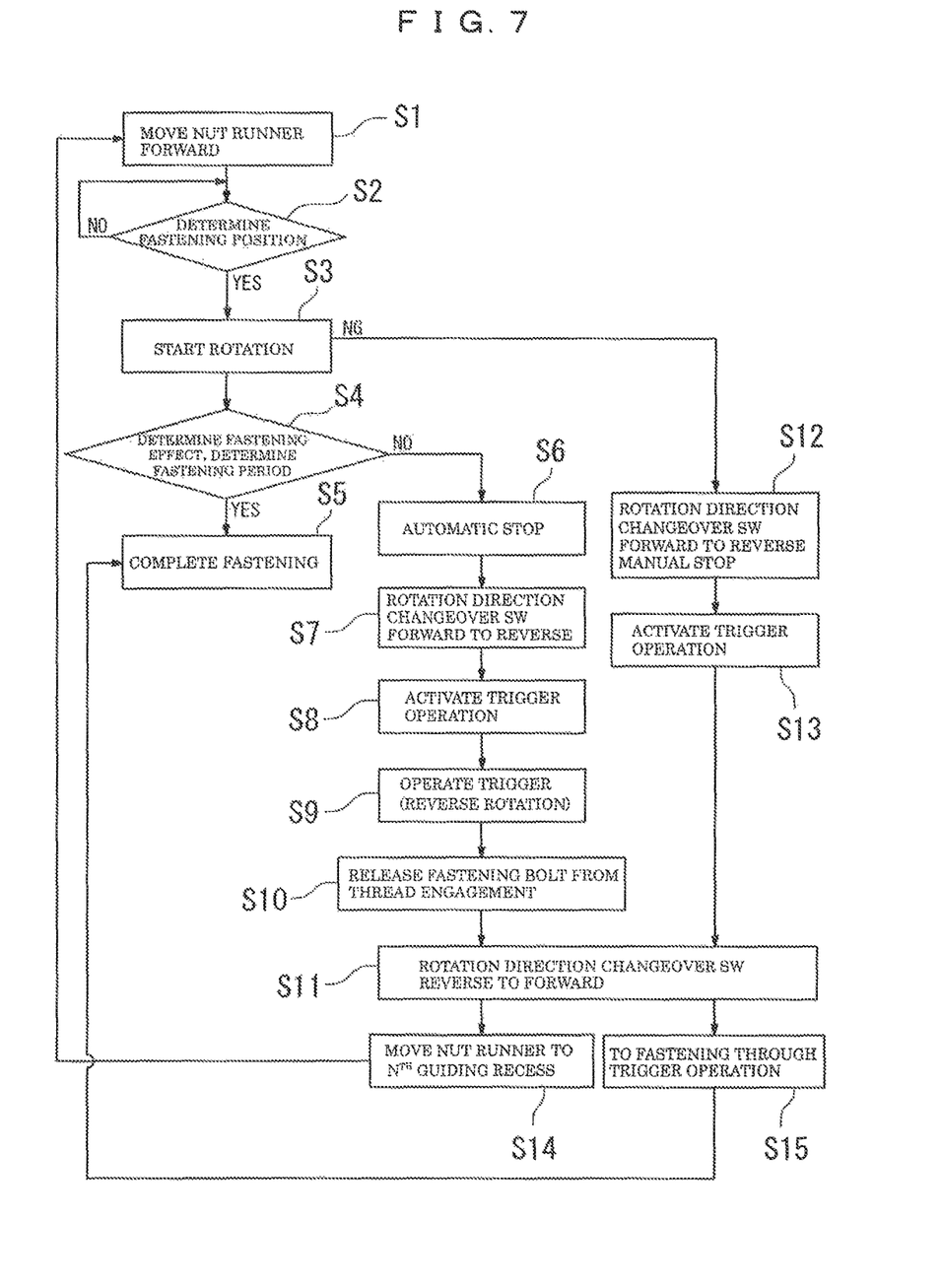
FIG. 7 is a flowchart of a step of fastening a fastener included in a fastening method using the fastening device according to the embodiment of the present invention.

A work flow of the step of fastening a fastening bolt will be described in detail based on a flowchart shown in FIG. 7.

In step S1, an operator moves the nut runner 5 forward to the fastening face 45 of the chain cover 2 along the nth guiding recess 36 of the guiding plate 35.

Next, in step S2, the main controller 10 determines whether the nut runner 5 has reached the nth fastening position of the chain cover 2. Once the condition is satisfied, the process moves to step S3. In step S3, the nut runner 5 is automatically driven to rotate by the NR driving controller 11, and the fastening bolt is screwed to a fixing hole (not illustrated) of the internal combustion engine 3 through a fastening hole (fastening position) of the chain cover 2.

On the other hand, when the condition in step S2 is not satisfied, the process returns to a step immediately preceding step S2, and the determination of the condition in step S2 is continued. In step S3, when an operator discovers a defect in rotation of the nut runner 5 caused by some reason, the process moves to step S12. In step S12, the operator manually stops rotation of the nut runner 5 by switching the rotation direction changeover switch of the nut runner 5 from the forward rotation direction to the reverse rotation direction. Then, a trigger operation of the nut runner 5 is activated in step S13, and the operator again switches the rotation direction changeover switch of the nut runner 5 from the reverse rotation direction to the forward rotation direction.

Next, in step S4, the NR driving controller 11 determines whether tightening torque of the fastening bolt has reached a predetermined value. At the same time, it is determined by the NR driving controller 11 whether a drive rotation period is within a given period of time (5 seconds in this embodiment). Once both of the conditions are satisfied, the NR driving controller 11 stops rotating the nut runner 5, and the fastening is completed at step S5. Then, information that fastening has been completed at the fastening position is stored in the main controller 10.

On the other hand, when any one of or both of the conditions are not satisfied in step S4, the process moves to step S6 where the NR driving controller 11 automatically stops rotating the nut runner 5. Then, as the operator switches the rotation direction changeover switch of the nut runner 5 from the forward rotation direction to the reverse rotation direction in step S7, the trigger operation is activated in step S8. Thereafter, the operator rotates the fastening bolt in the reverse direction by operating the trigger in step S9, and brings the fastening bolt back to a position where the fastening bolt is released from thread engagement with the fixing hole of the internal combustion engine 3 in step S10. Then, in step S11, the operator switches the rotation direction changeover switch of the nut runner 5 from the reverse rotation direction to the forward rotation direction.

With regard to works after step S11, the operator is able to select one of two flows (step S14 or step S15), as appropriate. This means that, when the process moves to step S14 from step S11, the operator retracts the nut runner 5 from the guiding recess 36 of the guiding plate 35 and moves the nut runner 5 back to the position parallel to the nth guiding recess 36. Hence, the operator is able to re-perform the aforementioned step of fastening a fastening bolt according to the embodiment of the present invention. At this time, the function of trigger operation of the nut runner 5 is deactivated once the nut runner 5 is brought back to the position parallel to the nth guiding recess 36 of the guiding plate 35.

On the other hand, when the process moves to step S15 from step S11, the operator fastens the fastening bolt again at the fastening position by operating the trigger in step S15, and the process moves to step S5 where the fastening work is completed. Then, the main controller 10 stores the information that the fastening work has completed at the fastening position.

As explained so far, the fastening device 1 according to the embodiment of the present invention includes at least the first to third rotary sensors 7a to 7c (position detecting unit) which are provided in the support arm 6 and detect a position of the nut runner 5, and the main controller 10 (controlling unit) which has the storage unit 8 for storing the position information of the plurality of fastening positions of the chain cover 2, and drives the nut runner 5 when detection results from the first to third rotary sensors 7a to 7c coincide with the position information of the fastening position of the chain cover 2 stored by the storage unit 8. Thus, an operator does not need to pull the trigger in order to rotate the nut runner 5 while fastening the fastening bolt, so the fastening work is significantly simplified compared to conventional fastening works. Moreover, even for the chain cover 2 which has a number of fastening positions located in very different height, a physical burden especially on the back and wrist of an operator during the fastening work is considerably reduced compared to conventional fastening works.

Yet further, the storage unit 8 of the main controller 10 stores not only the position information of the respective fastening positions of the chain cover 2, but also the fastening order of the respective fastening positions. Therefore, even if an operator follows a wrong fastening order of the fastening positions of the chain cover 2, the nut runner 5 is not driven at the fastening position in the wrong order, which leads to improved quality.

Further, the fastening device 1 according to the embodiment of the present invention includes the guiding jig 12 which guides the nut runner 5 to each of the fastening positions of the chain cover 2. In the guiding jig 12, the guiding recesses 36 are formed at positions corresponding to the respective fastening positions of the chain cover 2, on the inner peripheral face of the guiding plate 35 which extends like a ring on the outer side of each of the fastening positions of the chain cover 2, and the guiding recesses 36 lie parallel to the outer peripheral face of the socket cover 16 of the nut runner 5. Therefore, when an operator moves the nut runner 5 to a given fastening position of the chain cover 2, the operator only needs to locate the outer peripheral face of the socket cover 16 of the nut runner 5 at a position parallel to the inner peripheral face of the guiding recess 36 of the guiding plate 35 and then simply move the nut runner 5 forward along the guiding recess 36 to complete the fastening work. Hence, the fastening work is further simplified. Moreover, after completion of the fastening work, the operator is able to retract the nut runner 5 from the guiding recess 36 only by moving the nut runner 5 to the inner side of the guiding plate 35 and move the nut runner 5 to the next fastening position. Thus, a moving range of the nut runner 5 is minimized. In addition, since the guiding jig 12 is constructed only from the ring-like guiding plate 35 having the plurality of guiding recesses 36 in the inner peripheral face thereof, the costs of the guiding jig 12 can be reduced more than ever.

What is claimed is:

1. A fastening device comprising:
   a fastening tool;
   a support arm which holds the fastening tool and supports movement of the fastening tool to a plurality of fastening positions included in a fastening face of a work;
   a storage unit for storing, as data, the fastening position of the work;
   a position detecting unit for detecting a position of the fastening tool; and
   a controlling unit for driving the fastening tool when a detection result from the position detecting unit coincides with the fastening position of the work stored by the storage unit,
   wherein:
      the storage unit stores a fastening order of the respective fastening positions of the work, and
      when the controlling unit determines that the detected position coincides with a correct fastening position in the fastening order stored by the storage unit, a nut runner is allowed to be automatically driven thereby eliminating a pull of a trigger,
   wherein the fastening device further comprises a guiding jig which guides the fastening tool to the fastening positions of the work,
   wherein the guiding jig includes a guiding plate which extends like a ring over the fastening face and defines a single hollow inner space, the ring having a plurality of guiding recesses that are provided at positions corresponding to the fastening positions and are provided on an inner peripheral face of the ring that encloses the single hollow inner space, wherein the guiding recesses lie perpendicular to the rotation axis of the bolt to be fastened, and
   wherein the single hollow inner space is configured to allow the fastening tool to move directly from one guiding recess to any other without moving out of the single hollow inner space.

2. The fastening device according to claim 1, wherein the position detecting unit is constructed from a plurality of rotary sensors provided in the support arm.

3. A fastening method for fastening a fastener using a fastening device which has a fastening tool, and a support arm which holds the fastening tool and supports movement of the fastening tool to a plurality of fastening positions included on a fastening face of a work, the fastening method comprising the steps of:
   feeding a fastener to the fastening tool;
   moving the fastening tool to a first fastening position of the work with assistance from the support arm;
   detecting a position of the fastening tool;
   determining whether the detected position coincides with the first fastening position of the work stored by a storage unit; and
   in response to determining that the detected position coincides with the first fastening position of the work stored by the storage unit, allowing a nut runner to be automatically driven thereby eliminating a pull of a trigger,
   wherein the method further comprises attaching a guiding jig to the work, prior to the step of feeding the fastener, the guiding jig including a guiding plate which extends like a ring over the fastening face and defines a single hollow inner space, the ring having a plurality of guiding recesses that are provided at positions corresponding to the fastening positions and are provided on an inner peripheral face of the ring that encloses the single hollow inner space, wherein the guiding recesses lie perpendicular to the rotation axis of the bolt to be fastened, and
   wherein the method further comprises moving the fastening tool directly from one guiding recess corresponding to the first fastening position to another guiding recess corresponding to a second fastening position without moving the fastening tool out of the single hollow inner space.

4. The fastening method according to claim 3, wherein, in the step of moving the fastening tool to the first fastening position, the fastening tool is moved forward to the fastening face of the work along the guiding recesses of the guiding jig attached to the work so that the fastening tool reaches the first fastening position of the work.

5. The fastening method according to claim 3, further comprising the step of retracting the fastening tool from the first fastening position and moving the fastening tool to the another guiding recess corresponding to the second fastening position along the inner peripheral face of the ring, after fastening the fastener at the first fastening position.

* * * * *